United States Patent [19]

Lesgourgues et al.

[11] 4,146,165
[45] Mar. 27, 1979

[54] PROCESS FOR JOINING BY BRAZING-DIFFUSION

[75] Inventors: Jacques Lesgourgues, Corbeil; Bernard A. Blanchet, Montrouge, both of France

[73] Assignee: Societe Nationale d'Etude et de Construction de Moteurs d'Aviation, Paris, France

[21] Appl. No.: 849,474

[22] Filed: Nov. 7, 1977

[30] Foreign Application Priority Data

Nov. 12, 1976 [FR] France ................... 76 34545

[51] Int. Cl.² ......................................... B23K 1/04
[52] U.S. Cl. .................... 228/161; 228/165; 228/194; 228/212; 228/249
[58] Field of Search ............... 228/161, 160, 165, 194, 228/195, 212, 249, 251

[56] References Cited
U.S. PATENT DOCUMENTS

| | | | |
|---|---|---|---|
| 1,470,507 | 10/1923 | Steenstrup | 228/249 X |
| 2,440,298 | 4/1948 | Ronay et al. | 228/249 X |
| 2,528,280 | 10/1950 | Lyon | 228/161 X |
| 3,871,339 | 3/1975 | Kuhn | 228/249 |
| 3,918,623 | 11/1975 | Ishiguro et al. | 228/194 X |
| 4,046,305 | 9/1977 | Brown et al. | 228/194 |

Primary Examiner—C. W. Lanham
Assistant Examiner—K. J. Ramsey
Attorney, Agent, or Firm—Bacon & Thomas

[57] ABSTRACT

A procedure for joining parts by brazing-diffusion by
effecting a primary machining on the parts to be assembled in order to provide reservoirs for filling metal,
arranging a strip between the parts or deposit a coating on one of the parts,
filling the filling metal reservoir with a metal powder,
holding the parts together and providing pressure on the surfaces to be joined by means of screws or the equivalent,
placing the assembly within an enclosure containing a controlled atmosphere which is heated to cause, first, the filling metal to flow and, second, diffusion to take place, then
performing a secondary machining to eliminate the retaining screws and if possible the reservoirs.

3 Claims, 4 Drawing Figures

PROCESS FOR JOINING BY BRAZING-DIFFUSION

BACKGROUND OF THE INVENTION

The invention pertains to the joining of parts by brazing-diffusion, and more specifically of parts having complex shapes.

Joining by diffusion in the solid state, in vacuum and with the parts tightly held together, presents problems which restrict its application. The surface condition, tolerances and the required pressures on the parts prohibit the use of this technique for joining complex parts.

The solid-state diffusion welding technique was perfected by combining it with brazing. The two operations generally take place in a controlled atmosphere or in vacuo, and the filling metal used for the brazing is in powder, strip or coating form. The parts to be joined are subjected to pressure in order to make it possible, first, for the transitional liquid phase to flow and, second, for homogeneous bond to be formed by diffusion.

SUMMARY OF THE INVENTION

The invention is intended to adapt the brazing-diffusion technique to the production of parts of complex form and to reduce the pressure required to hold the parts together, while seeking to ensure proper flow of the filling metal between the parts to be joined.

The objective of the invention is a procedure for joining parts of complex shape by brazing-diffusion with a strip or coating between the parts intended to promote the flow, characterized in that it consists essentially of the following steps:

effect a primary machining of the parts so as to provide reservoirs for filling metal;

arrange the strip between the surfaces to be joined or deposit a coating on one of the parts;

fill the reservoirs with a filling metal in powder form;

hold the parts together and exert pressure on the surfaces to be joined by means of screws or equivalent means;

place the assembly within an enclosure under a controlled atmosphere which is heated in order to obtain, first, the flow of the filling metal and, second, diffusion;

and then effect a secondary machining so as to eliminate the holding screws and, if possible, the reservoirs.

Other characteristics and advantages of the invention will become clear in the course of the following description, which is accompanied by examples of achievements.

DESCRIPTION OF THE PREFERRED EMBODIMENTS

The preferred mode of achievement of the invention comprises several steps: primary machining, preparation, brazing-diffusion, and secondary machining.

The primary machining of the parts to be joined consists of forming the shapes required for application of the procedure, namely, forming the reservoirs and the holes for the screws which hold the parts together. The reservoirs may be provided in only one of the parts, in the form of cylindrical or tapered holes or of straight or circular grooves. The arrangement of such holes or grooves should allow the molten powder to flow over the entire extent of the surfaces to be joined.

The holding screws are made either of the same material as the parts to be joined or of a material having an expansion coefficient smaller than that of the parts. The pressure they exert holds the parts together and allows the operation to develop satisfactorily, and they are located so as to uniformly distribute the pressure over at least one of the surfaces to be joined.

The preparation phase consists of depositing a coating on the surfaces to be joined of one of the parts or, depending on the case, of preparing a strip having the same shape and size as the surfaces to be joined. This strip is generally overdimensioned by 0.5 to 1 mm in regard to the surfaces to be joined and its thickness may vary from a few $\mu$m to 250 $\mu$m. Its composition may vary, and the deposition may be effected by successive layers.

The strip or coating is intended essentially to promote the flow of the filling metal. During the brazing phase, the filling metal located in the reservoirs will ensure the filling of the joint.

The parts, held together by screws, are placed in an oven for the brazing-diffusion phase. The brazing-diffusion takes place within a controlled atmosphere oven. The cycle successively comprises the brazing stage and the diffusion stage; these stages may take place at different temperatures.

After cooling, the parts are removed from the oven and undergo the secondary machining. This machining eliminates the portions of the part through which the screws were inserted, and to eliminate, if possible, the filling metal reservoirs.

Figure 1:
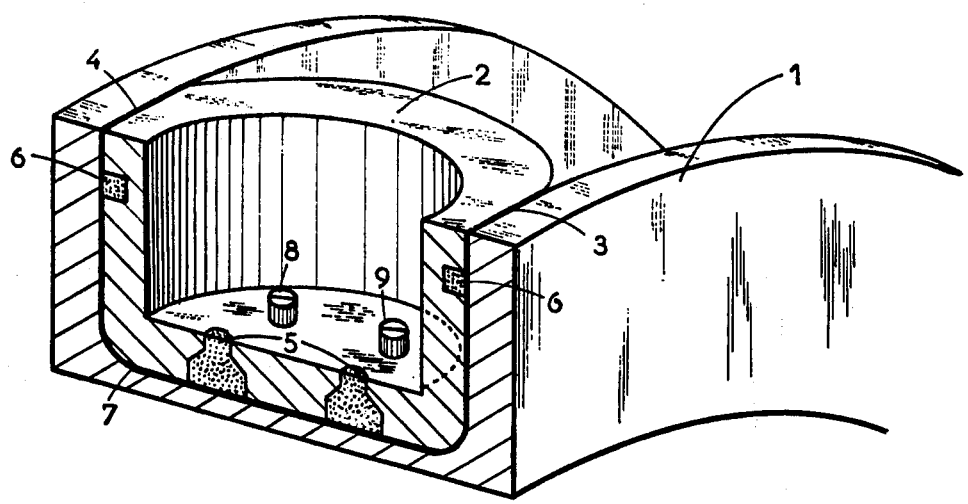
FIG. 1 is a sectioned perspective view depicting an example of application of the invention to achieve a collar of titanium or titanium alloy containing a boss also of titanium or titanium alloy.

The example of achievement of FIG. 1 shows an assembly after preparation and before introduction into the vacuum treatment oven.

The assemblage comprises a circular collar 1 onto which is to be fixed one or several bosses 2 distributed along its periphery. Since such a part (collar and boss), made of TA5E alloy, is difficult to produce by machining, it seemed more economical and simpler to join the boss onto an easily machinable part by brazing-diffusion.

The collar 1 has a U-shaped section. The bottom of the cylindrical hollow boss 2 is shaped so as to come into contact with the bottom of the U and contains two flats 3 and 4 which contact the sides of the U. It also contains the reservoirs 5 and 6 produced in the first machining.

Reservoirs 5 are cylindrical holes each ending with a tapered section whose larger base has the same diameter as the cylindrical hole and whose smaller base, which opens out, has a smaller diameter through which the powder is introduced.

Reservoirs 6 are straight blind grooves machined in the flats of the boss. A single groove may be provided, as long as it lies at the upper level while the part is laid flat within the treatment oven.

Other types of reservoirs, differently located, may be formed. For example, one or more grooves may be provided in the bottom surface of the boss or in the sides of the collar which face the flats of the boss.

A strip 7, formed before the parts are assembled, lies between the collar 1 and the boss 2. This strip has a thickness of 50 μm; it is composed of 70% titanium, 15% copper and 15% nickel, with a solidification temperature in the range of 900°–940° C. In order to obtain a satisfactory filling at the boundaries of the parts, the strip is prepared so as to cover all the surfaces to be joined with an overflow of 0.5 to 1 mm.

The strip may be replaced by an electrolytic coating on the surfaces of the boss to be joined. This coating consists of three successive layers of Ni, Cu and Ni, respectively 3, 6 and 3 μm thick.

The parts are held together in place by means of screws 8 and 9 of identical composition to that of the parts to be joined. These screws are thus made of TA5E.

All parts are cleaned before they are assembled. The reservoirs are filled with finely powdered metal (70% Ti, 15% Cu, 15% Ni) either before or after the assembly, depending on their position, and the assembly is then placed in the treatment oven under vacuum.

The brazing operation takes place in two phases calling for two stages of temperature, each of which is maintained for 15 minutes. The first stage takes place at 870° C. and the second at 980° C., giving rise to the transitional liquid phase which results from the melting of the filling metal. The diffusion operation then occurs at 900° C. for 2 hours.

Figure 2:
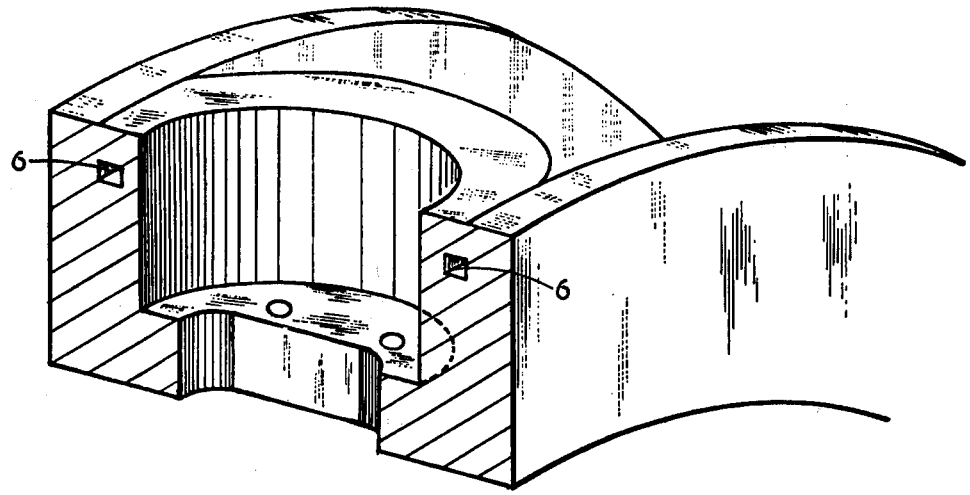
FIG. 2 is a sectioned perspective view depicting the part of FIG. 1 in its finished configuration after the secondary machining.

FIG. 2 shows the part after the secondary machining. This procedure removes the cylindrical reservoirs 5 and the screws 8 and 9. In the embodiment of this figure, the reservoirs 6 remain inside the part.

Figure 3:
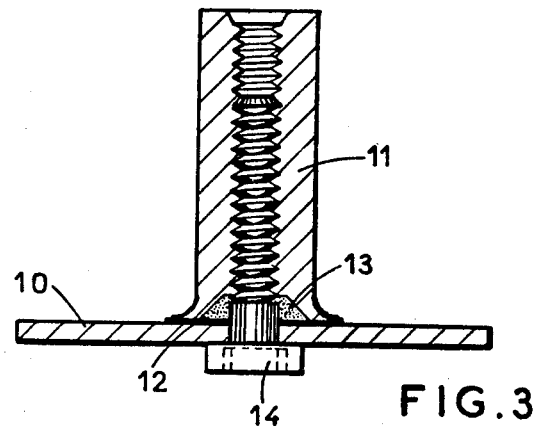
FIG. 3 is a cross section of another type of part achievable according to the invention.
Figure 4:
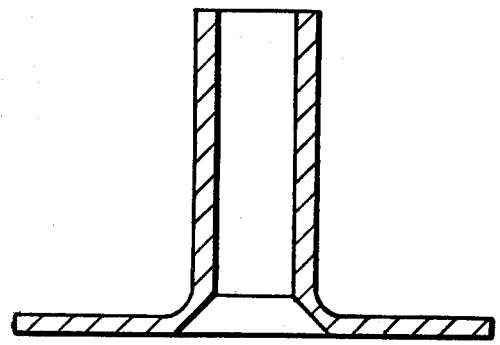
FIG. 4 is a cross section of the part of FIG. 3 after the secondary machining.

FIGS. 3 and 4 depict another example of achievement according to the invention, also consisting of parts made of TA5E alloy.

FIG. 3 shows a plate 10 on which is placed a threaded sleeve 11.

A strip 12 is arranged between the parts 10 and 11. It is 50 μm thick and extends 0.5 to 1 mm beyond the edges of the surfaces to be joined.

The strip may be replaced by a Ni, Cu, Ni electrolytic coating deposited on the surface of the sleeve to be joined. The various layers will have thicknesses of approximately 3, 6 and 3 μm respectively.

A reservoir 13 is provided in the sleeve 11. It is tapered, with the large end on the surface to be joined. The reservoir is filled with filling metal in finely powdered form, composed of 70% Ti, 15% Cu and 15% Ni.

A screw 14, also of TA5E, holds the parts together and provides the pressure required for the diffusion.

As before, the brazing takes place at 870° C. for 15 minutes and then at 980° C. for 15 minutes, in order to achieve the fusion of the transitional liquid bonding phase. The diffusion operation occurs at 900° C. over 2 hours.

The part is shown in FIG. 4 after secondary machining. The screw and the reservoir are removed.

The joining procedure according to the invention is applicable also to simple flat parts. One may also, in the case of the collar of FIG. 1, for example, attach shaped rectangular bosses provided with reservoirs in the bottom of the U of the collar by retaining them with screws.

The invention is not limited to the examples shown and described above; it applies equally to the joining of parts made of materials other than titanium or titanium alloys and applies particularly to steels and superalloys.

We claim:

1. A process for joining parts by brazing-diffusion, comprising the steps of:
   forming reservoirs in a face of at least one part to be joined;
   filling said reservoirs with brazing metal;
   securing said parts together, with retaining screws, with said face of said one part abutting the other part;
   heating said parts in a controlled atmosphere to cause said brazing metal to flow and diffuse; and
   thereafter machining said reservoirs and retaining screws from said parts.

2. A process as defined in claim 1 wherein said securing step is performed with retaining screws of the same material as said parts.

3. A process as defined in claim 1 wherein said securing step is performed with retaining screws having a lower coefficient of expansion than the parts to be joined.

* * * * *